UNITED STATES PATENT OFFICE.

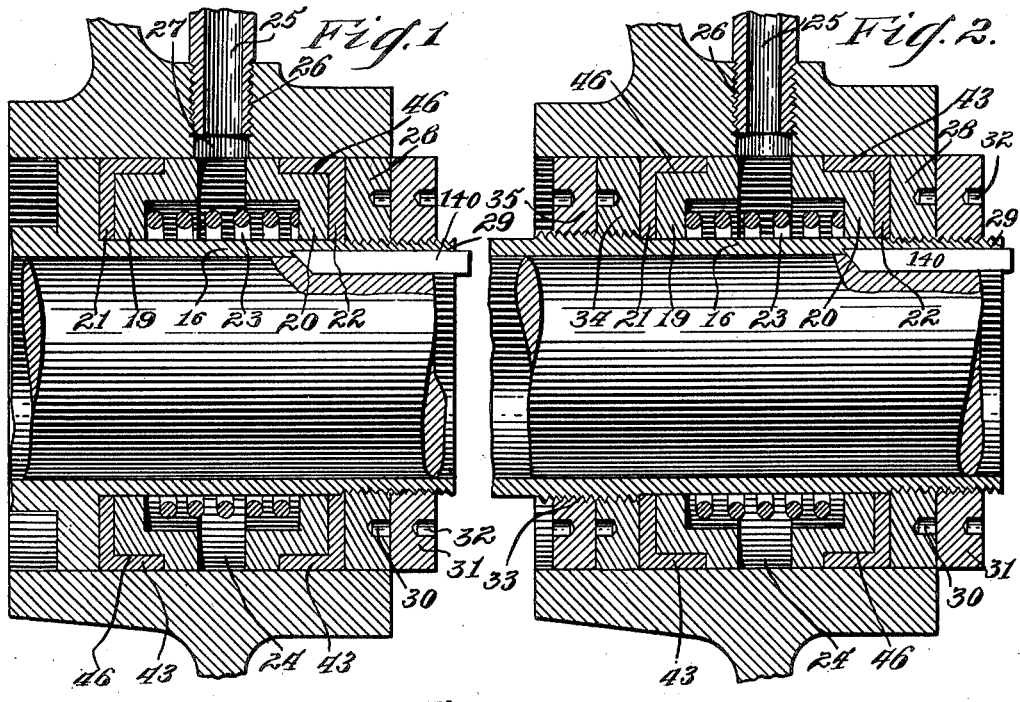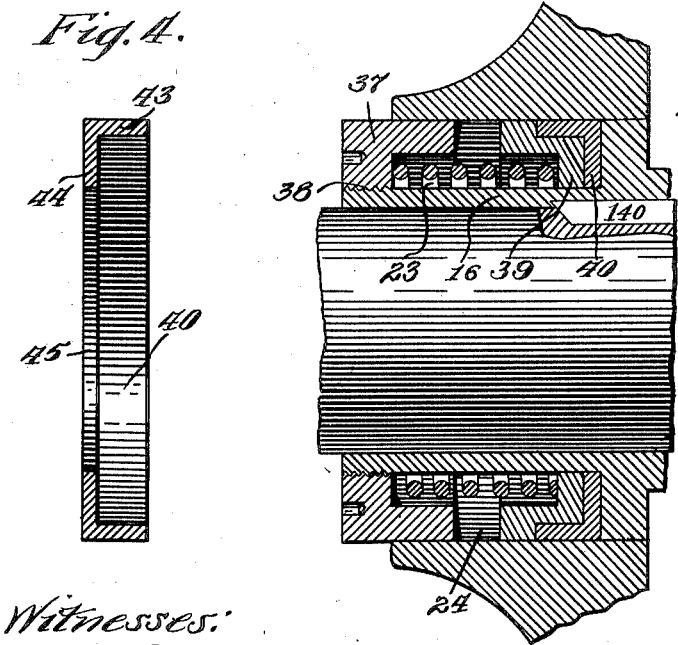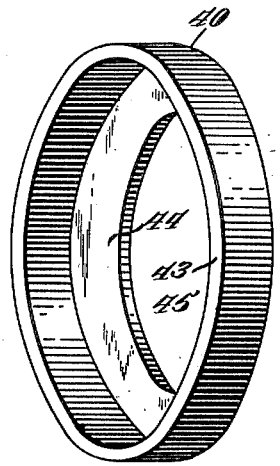

EDWARD S. LEA AND JULIUS DEGEN, OF TRENTON, NEW JERSEY, ASSIGNORS, BY MESNE ASSIGNMENTS, TO LEA-DEGEN PUMP COMPANY, OF TRENTON, NEW JERSEY, A CORPORATION OF NEW JERSEY.

AUTOMATIC PACKING.

No. 811,934. Specification of Letters Patent. Patented Feb. 6, 1906.

Application filed May 6, 1905. Serial No. 269,150.

*To all whom it may concern:*

Be it known that we, EDWARD S. LEA, a citizen of the United States, and JULIUS DEGEN, a citizen of the Republic of Switzerland, residing at Trenton, in the county of Mercer and State of New Jersey, have invented certain new and useful Improvements in Automatic Packing, of which the following is a specification.

The invention has reference to means for packing rotatably-mounted shafts in their bearings, and is more especially directed to means for automatically compensating for the wear which occurs at the bearings, and is also to provide means whereby when desired the packing device may be flooded with a pressure equal to that of the pressure on either side of said packing devices, so as to prevent leaking from the packing devices.

The application of this invention to various purposes in the various arts is contemplated, and one of the arts in which the invention may be considered especially applicable is that comprehending various types of centrifugal pumps for packing the shaft at points where it passes through the pump-casing, as well as where it passes through the partitions forming the cells therein. By this citation of an instance of the application of this invention, however, it is not to be construed that the scope of this invention is limited to such particular application.

An embodiment of the invention is illustrated by the accompanying sheets of drawings, whereon—

Figure 1 illustrates a view in elevation and in section of a form into which the invention may be embodied. Fig. 2 illustrates a similar view showing a different form of construction. Fig. 3 illustrates still another form. Fig. 4 illustrates an elevational view in section of a packing-ring. Fig. 5 illustrates a perspective view of the same.

In the several illustrations similar characters of reference apply to similar parts.

The bore 11 of a portion 12 of a pump-casing where the packing device is placed is larger than the shaft 13, which may be provided with a collar 14, carried in the present instance by a sleeve borne by the shaft, but which collar within the range of mechanical skill may, if desired, be formed on the shaft.

Movably mounted upon the sleeve 16 in the present instance, which may be fixed to the shaft by a key 140, are rings 19 and 20, respectively, each of which may be pressed in opposite directions against right-angularly-formed packing elements 21 and 22, which may be of any suitable material best adapted for the purpose either by a spring 23, which is convoluted around the sleeve 16 and which occupies a chamber 24, or a source of pressure through a conduit 25, screw-threaded, as at 26, into an opening 27, formed in the journal 18 of the rotating member.

The packing devices comprehending the packing elements, rings, and spring may be secured upon the sleeve 16 by a nut 28, which may be screw-threaded onto a screw-threaded portion 29 of the sleeve and may be operated by an implement, (not shown,) which may take into sockets 30, and this nut may be secured in place by a jam-nut 31, which may also be screw-threaded onto the screw-threaded portion 29 and may also be provided with sockets 32 to receive the implement.

In the form illustrated in Fig. 2 the sleeve 16 may be provided with a screw-threaded portion 33, to which may be secured a nut 34, which may be secured in place by a jam-nut 35, and these two nuts will take the place of the collar 14. (Illustrated in Fig. 1.)

In the form illustrated in Fig. 3 the ring 37, which corresponds to the ring 19, (illustrated in Fig. 1,) may be screw-threaded, as at 38, onto the sleeve 16. The spring 23 will be limited in its movement in this direction by the location of this sleeve, and in this form the floating ring 39 is adapted to press one packing element 40 against a flange.

As appertaining to the structures thus far described, the packing elements 21, 22, and 40 may be of annular construction and may comprise two angularly-related portions 43 and 44, the latter being provided with an opening 45 to accommodate the sleeve 16 and the former extending laterally and preferably substantially at right angles to the latter. It will be understood, of course, that the packing elements may be formed of any suitable substance or material, leather being considered practical. To accommodate the laterally-extending projections 43 of the packing elements, the rings 19 and 20 may be provided with recesses 46.

It will be seen that there is provided means for automatically packing the elements in their bearings and that such means also comprehends instrumentalities for automatically taking up the wear which may take place in such devices. It will also be observed that we provide a packing device which can be flooded with a pressure whereby to equalize the pressure on either side of the packing and prevent leakage.

It will now be seen that the packing elements, which preferably may constitute angularly-formed flexible rings, cups, washers, or the like, are adapted to rest one portion against the collar on the shaft and the other portion on a part remote from the shaft, but parallel therewith.

Within the purview of this invention we may resort to various constructions or assemblage of parts adapted to produce the results sought to be obtained, and therefore it must be understood that the constructions illustrated in the accompanying sheets of drawings, together with the detail description thereto appertaining, shall not be construed as confining this invention to the particular form of mechanism herein illustrated and described.

Having thus described this invention, we claim—

1. A construction for packing revoluble shafts against leakage of fluid on either side thereof, consisting of the shaft, a sleeve surrounding said shaft, and fixed to the shaft a collar thereon, a flexible packing element having angularly-disposed walls, one of which is adapted to press against said collar, and the other against a surface at right angles to the collar and parallel to the shaft.

2. A construction for packing revolving shafts against the leakage of fluid on either side thereof, consisting of a sleeve surrounding the shaft, and fixed to the shaft a collar rotating with the shaft, a flexible packing element having right-angularly-disposed walls, one of which may be pressed against said collar, and the other against a surface at right angles to said collar and parallel to the shaft, and means to press said walls of said element in both directions and against both surfaces.

3. A construction for packing revolving shafts against the leakage of fluid on either side thereof, consisting of a sleeve surrounding the shaft, and fixed to the shaft a collar rotating with the shaft, a flexible packing element having right-angularly-disposed walls, one of which may be pressed against said collar, and the other against a surface at right angles to said collar and parallel to the shaft, and a spring exerting its force upon the packing element to press it against the collar.

4. A construction for packing revolving shafts against the leakage of fluid on either side thereof, consisting of a sleeve surrounding the shaft, and fixed to the shaft a collar rotating with the shaft, a flexible packing element having right-angularly-disposed walls, one of which may be pressed against the collar and the other against a surface at right angles to the collar and parallel to the shaft, a member fitting in the angular recess of the packing elements and means to press the packing and the member against or toward the collar.

5. A construction for packing rotating shafts against the leakage of fluid on either side thereof, consisting of a sleeve surrounding the shaft, and fixed to the shaft collars rotating with the shaft, flexible packing elements each having right-angularly-disposed walls one of each of which may be pressed against the collars in opposite directions and the other against surfaces at right angles to said collars and parallel to the shaft, and means to create the pressure.

6. A construction for packing revolving shafts against the leakage of fluid on either side thereof, consisting of a sleeve surrounding said shaft, and fixed to the shaft collars rotating with the shaft, flexible packing elements having right-angularly-disposed walls one of each of which may be pressed against the collars and the others against surfaces at right angles to said collars and parallel to the shaft, members fitting in the angular recess of said elements, and a spring to press said elements and members in opposite directions against and toward the collars.

7. A construction for packing revolving shafts against the leakage of fluid on either side thereof, consisting of a sleeve surrounding the shaft, and fixed to the shaft collars rotating with the shaft, a flexible packing element having right-angularly-disposed walls one of which may be pressed against said collars and the other against surfaces at right angles to said collars and parallel to the shaft, a duct through which pressure may be forced against said packing elements to force them to a packing position.

EDWARD S. LEA.
JULIUS DEGEN.

Witnesses as to Edward S. Lea:
F. W. HUTCHINSON,
FRED. W. BARNACLO.

Witnesses as to Julius Degen:
JOHN H. MURRAY,
W. A. HOLCOMB.